(No Model.) 2 Sheets—Sheet 1.
J. R. WILSON.
DUMPING APPARATUS.
No. 565,399. Patented Aug. 4, 1896.
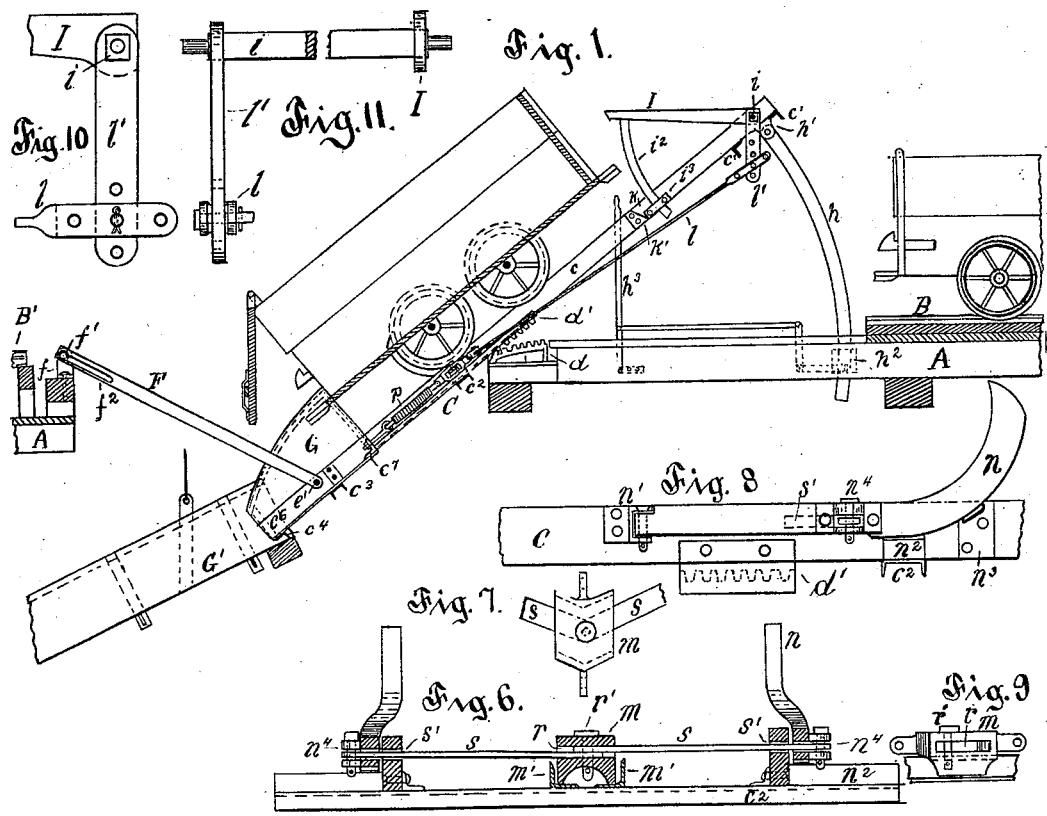
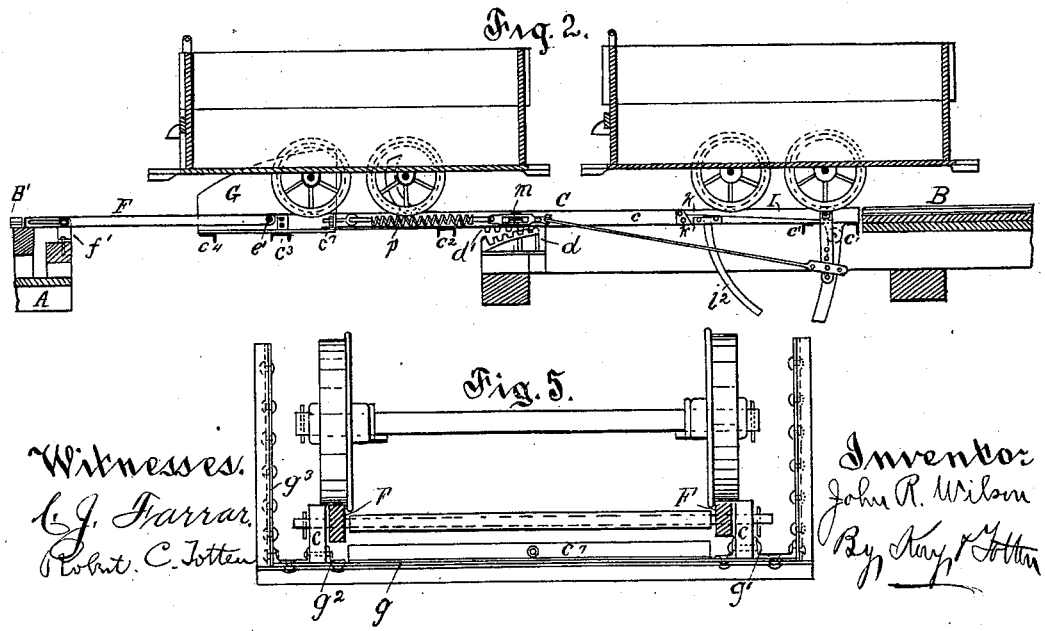
Witnesses:
C. J. Farrar
Robt. C. Totten
Inventor
John R. Wilson
By Key & Totten
Attorneys.
THE NORRIS PETERS CO., PHOTO-LITHO., WASHINGTON, D. C.

(No Model.) 2 Sheets—Sheet 2.
J. R. WILSON.
DUMPING APPARATUS.
No. 565,399. Patented Aug. 4, 1896.
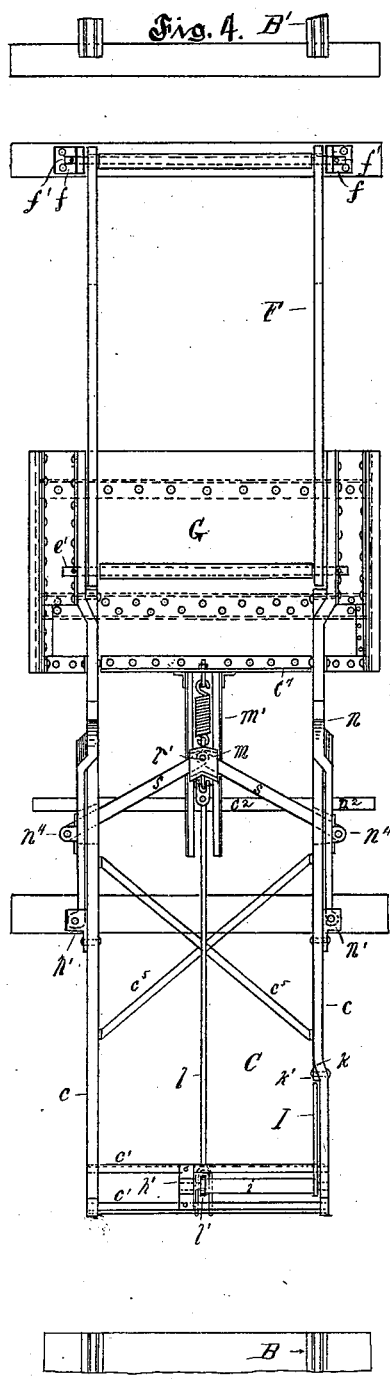
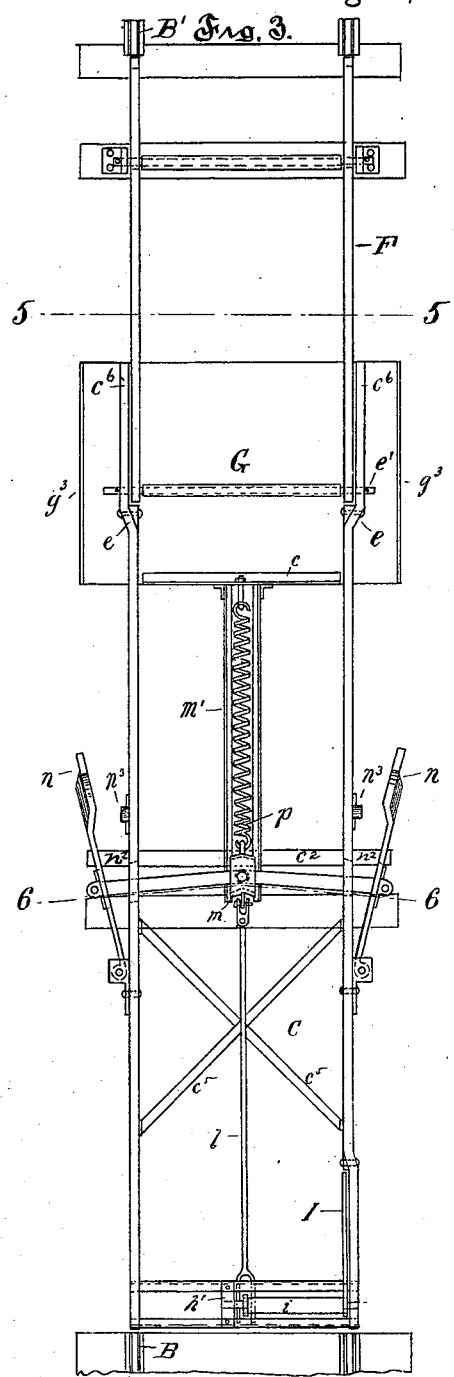
Witnesses
Chas. J. Farrar.
L. A. Griffith.
Inventor
John R. Wilson
By Kay & Totten
Attorneys.
THE NORRIS PETERS CO., PHOTO-LITHO., WASHINGTON, D. C.

UNITED STATES PATENT OFFICE.

JOHN R. WILSON, OF PITTSBURG, PENNSYLVANIA.

DUMPING APPARATUS.

SPECIFICATION forming part of Letters Patent No. 565,399, dated August 4, 1896.

Application filed April 22, 1895. Serial No. 546,673. (No model.)

*To all whom it may concern:*

Be it known that I, JOHN R. WILSON, a resident of Pittsburg, in the county of Allegheny and State of Pennsylvania, have invented a new and useful Improvement in Dumping Apparatus; and I do hereby declare the following to be a full, clear, and exact description thereof.

My invention relates to car-dumping apparatus, and more particularly to that class of dumping apparatus in which the empty car, after the contents are dumped therefrom, is passed forward from the tilting track-section over a movable track-section to a stationary track in front thereof, so that it may be quickly followed by another car, such, for example, as shown in Letters Patent No. 475,049, granted to me May 17, 1892. It has for its object the employment of a simple and durable construction of mechanism which is strong and not liable to get out of order and can be built more cheaply than the apparatus previously in use, as well as to combine with these dropping rails connecting the tilting and stationary track-sections a guiding-chute to direct the coal to the screens below the dumping apparatus.

The invention therefore comprises certain novel features of construction to accomplish such results, which will be fully set forth and claimed.

To enable others skilled in the art to make and use my invention, I will describe the same more fully, referring to the accompanying drawings, in which—

Figure 1 is a side elevation, partly broken away, of a dumping apparatus embodying the invention and showing the track-section tilted. Fig. 2 is a like view showing the track-section in its normal position. Figs. 3 and 4 are plan views. Fig. 5 is an enlarged cross-section on the line 5 5, Fig. 3. Fig. 6 is an enlarged cross-section on the line 6 6, Fig. 3, the horns being closed. Figs. 7, 8, and 9 are detail views; and Figs. 10, 11, and 12 are detail views of the rocker-shaft.

Like letters indicate like parts in each of the views.

The trestle A may be of any suitable construction, and it supports the rear stationary track-rails B and the forward stationary track-rails B', upon which the cars travel to and from the dumping apparatus, and between them the tilting track-section C, which is connected with the forward stationary track-rails by dropping track-rails F. The tilting track-section consists of two wrought-iron or steel bars, which are rectangular in cross-section, and are connected together by suitable cross-bars and braces, such as the cross-bars $c'$ $c'$ at the rear, the cross-bar $c^2$ about midway, and the cross-bars $c^3$ $c^4$ at the forward end, all of which extend below the rails and are connected thereto by angle-pieces riveted to the cross-bars and by horizontal rivets passing through the longitudinal bars $c'$, these several cross-bars being made of angle or channel bars to increase the strength of the structure. It has also the diagonal brace-bars $c^5$, riveted directly to the longitudinal bars.

I employ the longitudinal bars rectangular in cross-section instead of the ordinary T-rails heretofore employed, because a much stronger tilting track-section can be obtained, as the bars can be riveted through these rectangular bars without the necessity of forming seats for them or of the cutting into the bars for that purpose, as has been the case where T-rails were employed, and because the bars themselves can be heated and bent where necessary, while the flat faces thereof are retained for receiving the tripping-lever and for connection with the dropping rails, so that a much stronger tilting frame of practically the same or less weight is obtained, this being of importance, as it is found that in employing the ordinary T-rails the heating of the same throws the metal on strains, and the removal of the parts thereof weakens the same, while the connections are necessarily made to the thin flange or web and as rigid and durable bars cannot be obtained. This tilting track-section is required to withstand very severe jars, as it is tilted many times during an hour for the dumping of the load and receives the jar of the whole weight of the car and its load, and such change in construction in view of the jar and strains to which it is subject is important in sustaining the strains and overcoming the necessity for frequent repairs, while it can be formed with much less hand-labor and cost.

The track-section is mounted on the rocker-shoes $d$, secured to the trestle, the track-section resting upon the rocker-shoes $d$, which have flanges extending up the side of the rails $c$ and bolted thereto, the rocker-shoes having cogged faces to hold them in line with each other. To form the connection of the track-section with the forward track-rails B', the dropping track-rails F are employed, and for that purpose the main rails or bars $c$ are bent at $e$, so that the dropping rails fit within them, and the cross-bar $e$ passes through the dropping rails and the tilting section-rails $c$ to form a pivotal joint between the two, while the forward ends of the dropping rails are connected to, or in line with, the track-rails B' by means of brackets or bearings $f$, secured on the trestle, in which is mounted the cross-bar $f'$, which passes through longitudinal slots $f^2$ at the forward ends of the dropping rails, so that when the track-section is tilted and the dropping rails pass down with it said slots will pass over the cross-bar $f'$, permitting the downward movement of the rails, the slotted bars sliding on said cross-bar $f'$, and when the dropping rails are in their normal position they form the connection of the track between the tilting section C and stationary rails B'.

In order to prevent the dropping of the coal any great distance when it is dumped from the car, I have combined with the tilting track-section and dropping rails a guiding-chute G, carried by the tilting track-section, which, as the section is tilted, swings down and rests upon the upper end of the screen G', as shown in Fig. 1, this chute being of greater width than the body of the car, so that the car can pass along it when in its normal position and pass off the tilting track-section, the chute in such case fitting up close to the dropping rails, as shown in Fig. 2, and the chute having the vertical side plates which confine the coal so that it necessarily passes onto the screen. For this purpose and to support this chute I have extended the rails $c$ of the tilting track-section beyond said pivotal connection with the dropping rails, as at $c^6$, and support the chute by means of such rail extensions, and for that purpose, as shown in Fig. 5, the metal plates $g$, forming the bottom of the chute, are, as shown, riveted to the cross-bars $c^3$ $c^4$ and to the angle-pieces $g'$ $g^2$, by which the plates are secured to the rails $c$, the plates $g$ extending on each side of the rails and supporting the vertical side plates $g^3$, the space between such plates being greater than the width of the car-body or its wheels, so that the car can pass between the plates when the tilting track-section is in its normal position. These side plates are secured in place by braces connected to the bottom plate $g$. It will be noticed that the dropping rails are of less vertical thickness than the rails $c$ and that they fit above the angle-pieces $g^2$, and in swinging in the dumping operation do not interfere with the downward movement of the chute.

Connected to the rear end of the tilting track-section C is the brake-bar $h$, which is pivoted to the bracket $h'$, extending between the cross-bars $c'$ and extends down to the brake $h^2$, which may be of any desired construction, as it forms no part of the present invention, the brake being operated by the brake-lever $h^3$.

At the rear end of one of the rails of the tilting track-section is the tread-lever I, which is secured to the rock-shaft $i$, which is mounted in the rail $c$ and in the bracket $h'$. To provide space for this tread-lever the rail $c$ is bent outwardly at $k$ a sufficient distance to receive the tread-lever and then extends parallel with it, the tread-lever lying inside thereof and close thereto and to form a seat for the lever when depressed. At the point $k$ of the rail $c$ is secured the inclined block $k'$, which is riveted to the rails and squares the space, so that when the tread-lever is depressed it rests thereon and is prevented from being forced below the upper face of the rail.

To guide the movement of the tread-lever and hold it close to the rail, it is provided with a curved depending arm $i^2$, which passes through the guide $i^3$, which is riveted to the face of the rail $c$, preventing any lateral strain on the tread-lever. The rock-shaft $i$ carries at the end, close to the bracket $h'$, the depending arm $l'$, to which is connected the rod $l$, which extends forward and is connected to the shuttle $m$, by which the horn or car stops are spread to permit the passage of the car from the tilting track-section. This shuttle slides on the guideways or track formed by angle-bars $m'$, connected to the cross-bars $c^2$ $c^7$. The forward end of the shuttle is connected to a spring $p$, which is connected to the cross-bar $c^7$, so that when the tread-lever is depressed, through the rock-shaft $i$ and rod $l$, the shuttle is drawn backward, but as soon as the car passes from the tread-lever the spring $p$ draws the shuttle forward, so serving to force the tread-lever to its normal position. The shuttle $m$ has openings $r$ in the sides thereof, through which the toggle-arms $s$ pass, said arms being pivoted in the shuttle by the bolt $r$, the toggle-arms being above the guides $m'$, which do not interfere in any way with their movement. The horns or car-stops $n$ are pivoted in bearings $n'$, secured at the sides of rails $c$, the forward ends of the horns resting on and sliding over guide-rests $n^2$ on the cross-bar $c^2$, and their curved forward ends resting against shoes $n^3$, riveted to the outer face of the rails $c$. The toggle-arms $s$ extend out through openings $s'$ in the rails $c$, and are pivoted to the horn-stops in the bearings $n^4$ thereon, so that when the shuttle $m$ is drawn backward by the tread-lever the toggle-arms force the horns outwardly from the rails, and by spreading them away therefrom permit the passage of the car over the tilting track-section and over the dropping rails F to the forward stationary rails B', but as soon as the tread-lever is permitted to rise the spring $p$ by drawing on the shuttle through the toggle-arms draws the horn-stops back over the rails in position to catch the loaded car, which has depressed the tread-lever, and hold it in position for dumping. The shoes $n^3$ above referred to have inclined upper faces, as shown, and act to support the horns against longitudinal movement, the upwardly-curved parts of the horns bearing against such inclined faces. While I prefer to employ the guides $m'$ for the shuttle, the shuttle may be operated without such guides, as the pull of the rock-shaft lever is practically in direct line from the spring $p$ and will hold the shuttle in such line and thereby enable it to spread the horns equally from the track.

The operation of the apparatus is as follows: The loaded car coming from the mine passes over the rear track-rails B onto the tilting track-section C, which is then in its horizontal or normal position. When the front wheels of the car come into contact with the tread-lever, they depress it, causing the spreading of the horns or car-stops, and as soon as the car passes from the tread-lever the spring $p$, drawing on the shuttle, draws the car-stops back into normal position above the rails and the wheels of the car strike the horn-stops, the car being thus brought into position for dumping. The weight of the car when loaded is sufficient to cause the dumping of the tilting track-section, and by freeing the brake $h^2$ the weight of the car carries down the tilting track-section and the load is dumped from the car, the front door of the car having previously been unlatched. As the tilting track-section goes down it carries down with it the dropping rails and lowers the guiding-chute G onto the screen G', and the coal is only required to drop onto the chute, which directs it onto the screen without requiring any long vertical fall of the coal, so preventing the breaking up of the coal in dumping. As soon as the load is discharged the tilting track-section again assumes its normal position, as it is so balanced as to overcome the weight of the empty car, and it is held in that position by the brake, and the apparatus is ready to receive another loaded car. This car is then pushed onto the tilting track-section, and it first strikes its tread-lever and depresses it, which, through the rock-shaft and the rod $l$, draws on the shuttle $m$, and, through the toggle-levers $s$, spreads the horn-stops $n$ away from the tracks, and the loaded car, before it passes from the tread-lever, strikes the empty car and pushes it forward from the tilting track-section and along the dropping rails onto the stationary rails, so delivering it from the tilting track-section. The loaded car then passes off the tread-lever and the spring $p$ by drawing on the shuttle and through the toggle-levers draws the horn-stops over the rails $c$ in position to catch the loaded car, which strikes against the same and is then in position for dumping, and the operation above described is repeated.

The apparatus is simple in construction, and the several parts can be made strong and heavy, so that they are not liable to get out of order, while they are simple in form, require but few forging operations, and the connections can be made to the longitudinal side rails of the tilting track-section by simple means and without weakening the same, so that no expensive hand-labor in constructing the apparatus is required, and the main rails of the tilting track-section can be easily forged and are free from internal strain. I am also enabled to combine both the dropping rails and the guiding-chute for the coal when discharged from the car and so prevent the breaking up of the coal.

What I claim as my invention, and desire to secure by Letters Patent, is—

1. In dumping apparatus, the combination of a tilting track-section, having longitudinally-extending bars or track-rails, stationary rails in front of the same, dropping rails pivoted to the tilting track-section and forming the connections with the stationary rails in front thereof, and a guiding-chute extending out from the tilting track-section and supported by the rails thereof under said dropping rails, substantially as set forth.

2. In dumping apparatus, the combination of a tilting track-section, having longitudinally-extending bars or track-rails, a guiding-chute extending out from the tilting track-section and supported by and under extensions of such rails, stationary rails in front of the tilting track-section, and dropping track-rails pivoted to the tilting track-section within the track-rail extensions thereof, and lying parallel therewith and having the other ends held in line with the stationary rails, substantially as set forth.

3. In dumping apparatus, the combination of a tilting track-section, horn-stops mounted on the tilting track-section, a shuttle and connections between the same and the tread-lever, toggle-arms extending between the shuttle and horn-stops, and a spring connected to the shuttle and adapted to draw on the same and so close the horn-stops, substantially as set forth.

4. In dumping apparatus, the combination of a tilting track-section, horn-stops mounted thereon, a shuttle, and toggle-arms extending from the shuttle to the horn-stops, substantially as set forth.

5. In dumping apparatus, the combination of a tilting track-section having longitudinal guides thereon, a shuttle moving in said guides, horn-stops mounted on the track-section and toggle-arms extending from the shuttle to the horn-stops, substantially as set forth.

6. In dumping apparatus the combination of a tilting track-section, the rails of which are formed of wrought-metal bars rectangular in cross-section, one of the said rails being bent to form a recess, a tread-lever fitting in said recess and connections from said tread-lever to the horn-stops on the tilting track-section, substantially as set forth.

7. In a dumping apparatus, the combination with a tilting track-section having one of its rails bent to form a recess, an inclined block secured at the bend of said rail, a tread-lever having an inclined end fitting in said recess and against said inclined block, and connections from the tread-lever to said horn-stops, substantially as set forth.

8. A dumping apparatus having a tilting track-section having horn-stops mounted thereon, in combination with a tread-lever pivoted at one end and having on the other end a curved arm, a guide through which said curved arm passes, and connections from the tread-lever to the horn-stops for spreading the same, substantially as set forth.

In testimony whereof I, the said JOHN R. WILSON, have hereunto set my hand.

JOHN R. WILSON.

Witnesses:
ROBT. D. TOTTEN,
ROBERT C. TOTTEN.